United States Patent
Don et al.

(10) Patent No.: US 7,254,752 B1
(45) Date of Patent: Aug. 7, 2007

(54) PROTECTING DATABASE RECORDS AGAINST A FAILED WRITE OPERATION

(75) Inventors: Arieh Don, Newton, MA (US); Alexandr Veprinsky, Brookline, MA (US); Michael Scharland, Franklin, MA (US); Terry Seto Lee, Arcadia, CA (US); Philip E. Tamer, Westboro, MA (US)

(73) Assignee: EMC Corporation, Hopkinton, MA (US)

( * ) Notice: Subject to any disclaimer, the term of this patent is extended or adjusted under 35 U.S.C. 154(b) by 871 days.

(21) Appl. No.: 10/396,033

(22) Filed: Mar. 25, 2003

(51) Int. Cl.
*G06F 11/00* (2006.01)

(52) U.S. Cl. .................. 714/52; 714/22; 714/807

(58) Field of Classification Search ............ 714/52, 714/22, 807
See application file for complete search history.

(56) References Cited

U.S. PATENT DOCUMENTS

| | | | |
|---|---|---|---|
| 5,206,939 A | 4/1993 | Yanai et al. | |
| 5,381,539 A | 1/1995 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 2004/0003316 A1* | 1/2004 | Meng et al. ................ 714/13 |

* cited by examiner

*Primary Examiner*—Bryce P. Bonzo
(74) *Attorney, Agent, or Firm*—Muirhead and Saturnelli, LLC

(57) ABSTRACT

Described are techniques for processing data requests in connection with an I/O operation. A write data request is sent from a host to a target data storage system. The host performs a data validation, such as a checksum calculation, using the data of the data request. The data request is sent to the target data storage system. The target data storage system may be enabled to perform data validation processing on a per device basis by setting one or more device flag bits for a device. The target data storage system performs data validation processing in accordance with the flag bit settings of a device associated with a data request. A target checksum value using the data received on the target data storage system is determined and compared to the host checksum value in order to determined data validity. Data recovery processing is performed if data corruption is determined. A partial write of the data requested may be performed for those data portions occurring prior to the corrupted data that have been successfully validated.

38 Claims, 14 Drawing Sheets

PROTECTING DATABASE RECORDS AGAINST A FAILED WRITE OPERATION

BACKGROUND

1. Technical Field

This application generally relates to a computer system, and more particularly to techniques used with I/O operations.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations and also administrative tasks.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

An application may be executing on a host computer system. The application may issue I/O requests, such as a write request, to a storage device serving as a database device. The database may become corrupted for a variety of reasons. For example, the database may be left in an unknown state if the write request fails to complete properly, such as when the write request is interrupted in the event of a system reset. The database may be corrupted, for example, if the database records are written partially or include incorrect data creating corrupted data. Another application may also corrupt the database by performing non-database write operations to the database devices. The chance of a database corruption may further increase in a system including multiple communication paths accessed by one or more hosts performing I/O operations to the database.

If the database corruption is not detected until some amount of time after a corrupted record has been written to the database, the corrupted data may have also been further propagated to other sources, for example, in connection with subsequent reading and writing of the corrupt data.

When a database corruption is detected, the database is restored because of the unknown state of the data. The database restoration process may be characterized as expensive and time consuming. During the restoration process, the database is unavailable for a period of time while using computer system resources to restore the data included therein to a valid known state.

It may be desirable to have an efficient technique which provides for detection and determination of a database corruption associated with a write operation in a timely manner. It may also be desirable to provide for determination of corrupt data prior to writing the corrupt data to a device and to provide for processing when corrupted data is detected prior to writing the data such that the data on the device is left in a valid state.

SUMMARY OF THE INVENTION

In accordance with one aspect of the invention is a method for writing data associated with a write request to a target location comprising: associating, at a source location, a source data validation value with a portion of the data; determining if a target location is enabled for data validation processing; if the target location is enabled for validation processing, determining, for the portion of the data received at the target location, if the portion includes valid data using the source data validation value; and if the portion of data is determined as valid, storing the portion of data to the target location, and otherwise, if the portion of data is determined to be invalid, performing recovery processing using a scratch area.

In accordance with another aspect of the invention is a computer program product that writes data associated with a write request to a target location comprising: machine executable code that associates, at a source location, a source data validation value with a portion of the data; machine executable code that determines if a target location is enabled for data validation processing; machine executable code that determines for the portion of the data received at the target location, if the portion includes valid data using the source data validation value, when the target location is enabled for validation processing; and machine executable code that stores the portion of data to the target location if the portion of data is determined as valid, and otherwise, performs recovery processing using a scratch area if the portion of data is determined to be invalid.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
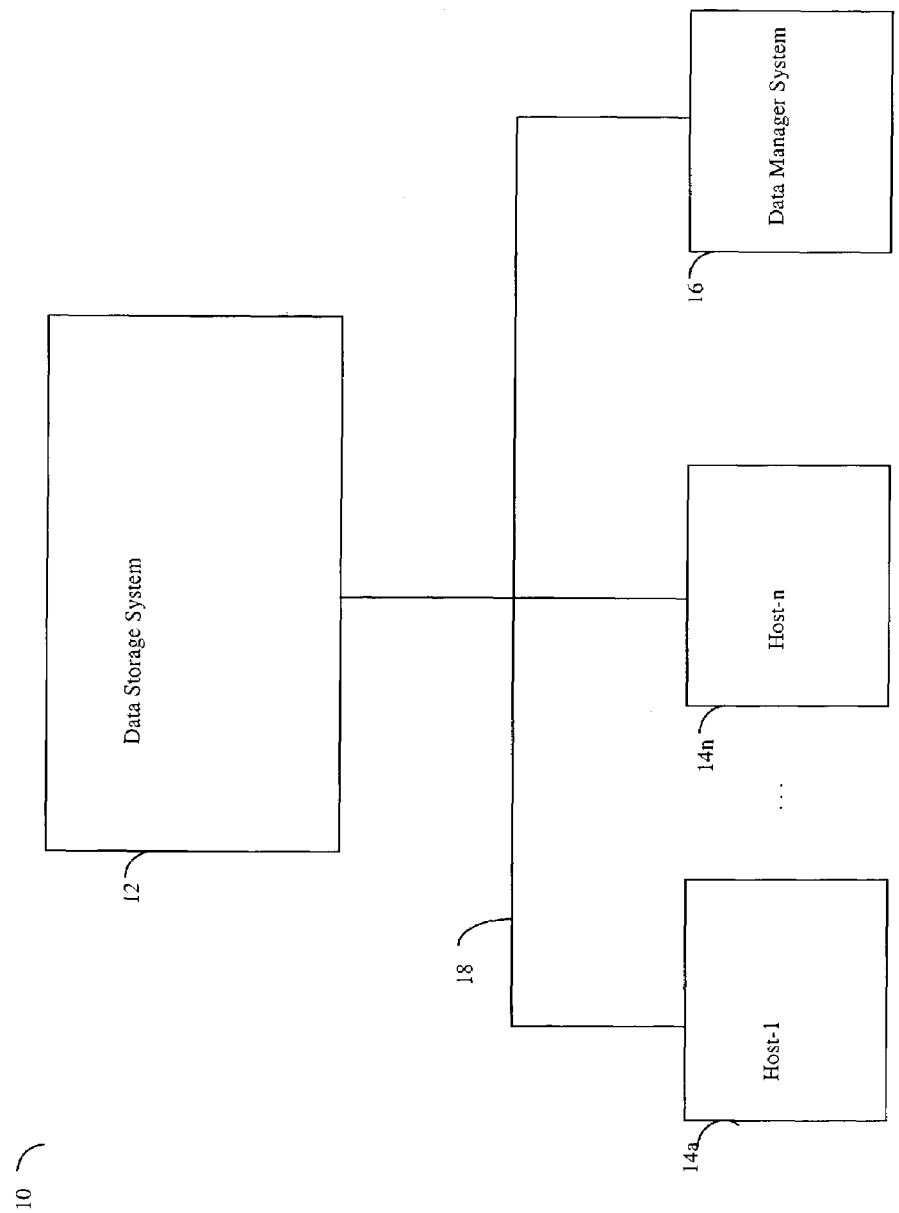
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a-14n, and a data manager system 16 through communication medium 18. In this embodiment of the computer system 10, the N hosts 14a-14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a-14n, and the data manager system may access and communicate with the data storage system 12, and may also communicate with others included in the computer system 10.

Each of the host systems 14a-14n, the data manager system 16, and the data storage system 12 included in the computer system 10 may be connected to the communication medium 18 by any one of a variety of connections as may be provided and supported in accordance with the type of communication medium 18. The processors included in the host computer systems 14a-14n and the data manager system 16 may be any one of a variety of commercially available single or multi-processor system, such as an Intel-based processor, or other type of commercially available processor able to support incoming traffic in accordance with each particular embodiment and application.

It should be noted that the particulars of the hardware and software included in each of the host systems 14a-14n and the data manager system 16, as well as those components that may be included in the data storage system 12 are described herein in more detail, and may vary with each particular embodiment. Each of the host computers 14a-14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a backup, mirroring or an administrative operation and may do so while performing data requests to the data storage system 12.

Figure 2:
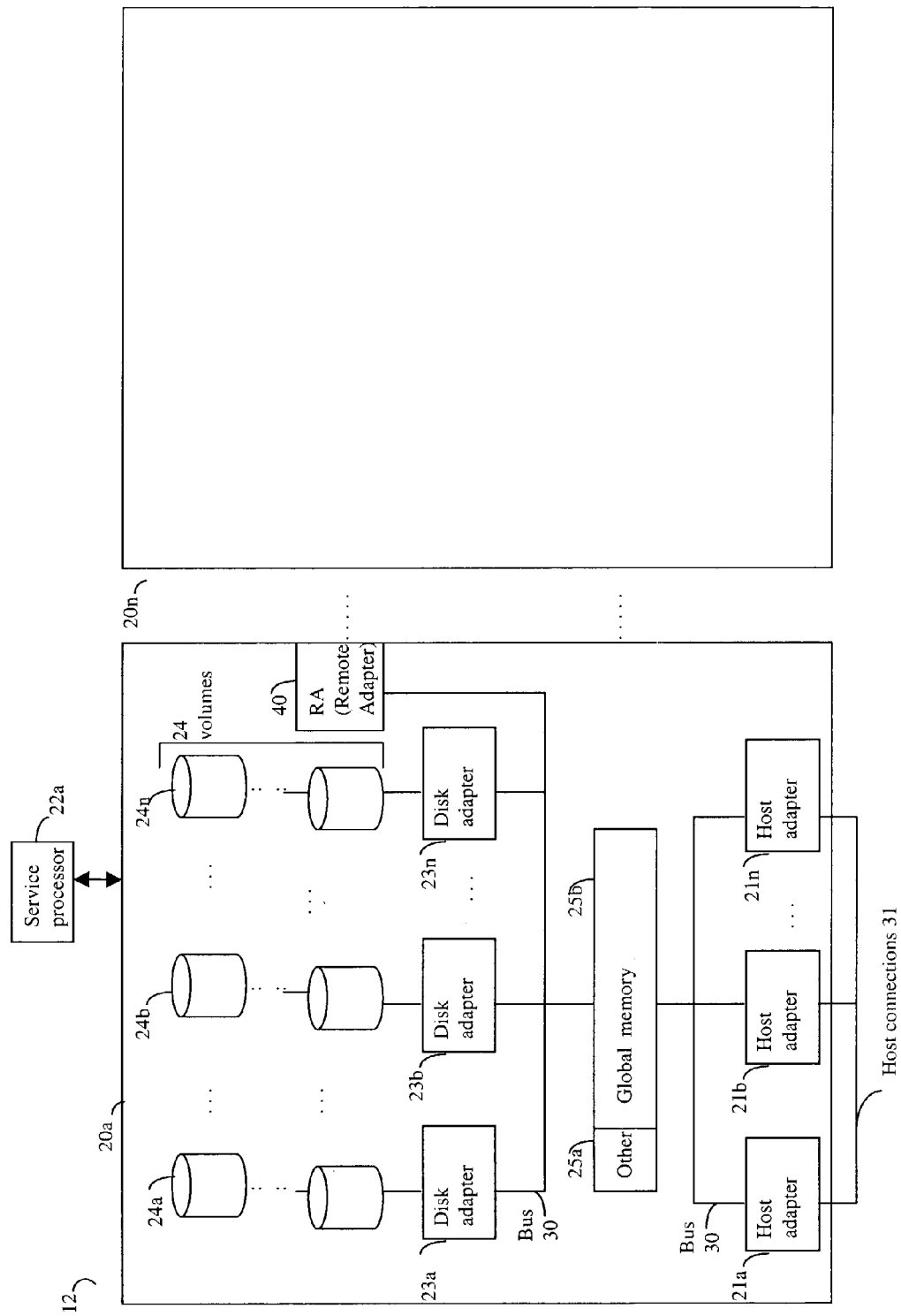
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a-20n as manufactured by EMC Corporation of Hopkinton, Mass. In this particular example, each of the Symmetrix™ storage systems 20a-20n may be interconnected (not shown) as well as to the host and data manager systems through any one or more communication connections 31 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a-20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a-23n are connected, for example, by a bus 30 to a cache that includes a particular portion designated as global memory 25b. The DAs 23a-23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a-14n. This performance data may be gathered and stored, for example, in the global memory and/or other storage area.

The system 20a may also include one or more host adapters ("HAs") or directors 21a-21n. Each of these HAs may be used to manage communications and data operations between one or more host systems and the global memory.

The particular data storage system as described in this embodiment, such as a Symmetrix™ system by EMC Corporation or a particular device, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with I/O operations of multiple LVs that may reside on a disk. The DA may accomplish this by creating job records for the different LVs associated with the particular DA. These different job records may be associated with the different LVs in a data structure stored and managed by each DA.

Figure 3:
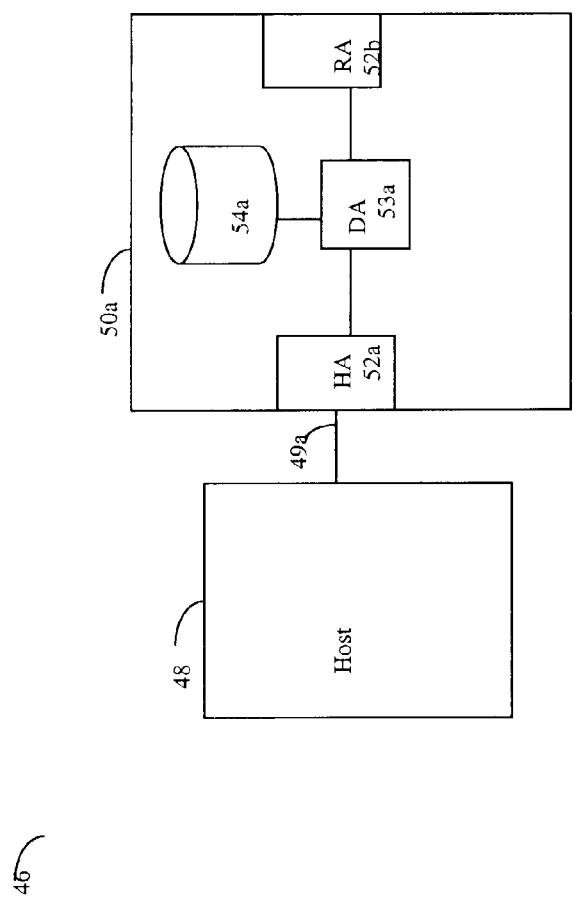
FIG. 3 is a simplified illustration of an example of an embodiment of the computer system of FIGS. 1 and 2.

Referring now to FIG. 3, shown is an example of an embodiment of a computer system 46 illustrating the relationship between a host 48 and a first data storage system 50a. It should be noted that the embodiment illustrated in FIG. 3 is a simplified view of components of a computer system, for example, including only some detail in data storage systems 50a for the sake of simplicity. The host 48 may issue a command to data storage system 50a over connection 49a using the HA 52a. An application, such as a database application program, executing on the host 48 may issue a database write request of a record to be stored on device 54a of data storage system 50a.

In connection with performing the write operation, the database application program executing on a host 48 may optionally provide for determination of a checksum value in accordance with the data of the record to be written. Use of a checksum is known to those skilled in the art as one technique that may be used in performing data validation. A checksum value may be determined prior to sending data, such as on the host. Another checksum value is determined at the target location, such as the target data storage system, and compared to the checksum determined prior to sending the data. If the checksum values do not match, the data received at the target location has been modified in some unexpected way and should not be written to the disk or other data storage device.

A database application may include a configurable option to enable the database application executing on the host to determine a host side checksum value or a database checksum value for a data record. In one embodiment that includes an Oracle™ database application, for example, a user may set the database option using database configuration parameters at initialization. An embodiment may also include functionality to dynamically modify the database checksum option, for example, by invoking an API (application programming interface). It should be noted that although this embodiment describes the host side checksum value in connection with a database, the host side checksum value should not be limited to this particular usage selected for the purposes of illustrating one particular embodiment described herein.

The database checksum value determined on the host may be obtained in any one or more of a variety of different ways. An embodiment may have a default or implied checksum value associated with each data record. For example, when the appropriate database checksum enable option is set in an Oracle™ database application, the database software executing on the host ensures that the checksum of the data record is always zero, such as by adjusting the transmitted data record to include data in accordance with the expected checksum. An embodiment may also calculate or obtain, such as through invoking another routine, each checksum value for a given data record. In one embodiment, the database checksum value may then be transmitted to the target, such as the Symmetrix data storage system, with the data record to be written. An embodiment may also not transfer or communicate this database checksum value, for example, in embodiments in which a checksum value is implied, such as the implied zero database checksum value described herein.

The target of the data operation may perform processing steps to utilize the checksum value of a data record for data validation. In one embodiment, the target data storage system has an Oracle™ checksum device bit associated with each device. This Oracle™ checksum device bit may be included as part of device configuration information included in the configuration file stored in global memory, for example. An embodiment may include an interface, such as an API, for accessing and/or dynamically modifying the Oracle™checksum device bit value after a data storage system is initially configured. When the Oracle™ checksum device bit value is enabled, the target data storage system may determine a checksum value associated with a received data request. In order to perform data validation processing steps on the target data storage system to compare the checksum value as determined by the target data storage system to an expected checksum value of data before transmission, one embodiment also includes a safe write device bit associated with each device. The safe write device bit is described elsewhere herein in more detail. When the safe write device bit is set, checksum or other data validation processing is performed for write data operations to the associated device. Otherwise, data validation processing for the associated device is not performed.

The target data storage system may optionally perform checksum processing as part of data validation prior to, for example, writing the actual data to the data storage device or committing the data to a database. On the data storage system such as 50a, each time a write operation is performed and the checksums do not match, a record to be written may be rejected and detected as including invalid data.

It should be noted that a host may include database support modules for use by an executing application utilizing database support, such as with an Oracle™ database. Other database support components may be used on the target data storage system or other computer system to manage the database. Referring back to FIG. 3, for example, the host adapter may include instructions for performing data validation checking as described herein. Particular components and location within each embodiment may vary in accordance with each embodiment.

An embodiment may utilize other techniques in connection with enabling and performing data validation. Additionally, an embodiment may optionally include designation of data validation for a different level of atomicity than per device, such as with the checksum device bit. For example, an embodiment may allow for enablement/disablement of data validation for a portion of a device.

The checksum is one mechanism by which a data validity check and corruption of data may be detected. Data corruption may happen for any one of a variety of different reasons such as, for example, when the data sent is corrupted, when a write fails to complete properly due to a device or hardware connection problem, or for an invalid write to a particular portion of a device such due to noise. These are just a few conditions that may cause data being written to a particular database device or other type of location on a storage device to be corrupted. The use of the checksum provides one means by which this corruption may be detected.

It should be noted that although aspects of the following description included herein may make particular reference to the Small Computer System Interface (SCSI) standard and compatibility, techniques described herein should not be construed as being limited to such embodiments.

An embodiment as described herein may operate in accordance with the SCSI standard such that, for example, if a write operation to an area on a storage device is interrupted, such as in connection with a system reset, the area of the write is left in an unknown state due to the uncertainty of how much data has actually been written. Accordingly, a database corruption error may be detected in connection with an interrupted write operation. What will be described herein are techniques that may be used in connection with processing data with the write operation in connection with handling corrupted data and the processing thereof.

In following paragraphs, although particular sizes and other parameters are used for the purpose of description herein, the techniques described are not limited to the particular instances chosen for the purpose of example.

In an embodiment, a database has a defined record size. This record size may be a constant size selected, for example, in connection with database configuration. In following paragraphs for the purposes of a specific example, a database record size of 8K bytes is selected. Each time a database record is updated, the database application executing on the host system 48 sends a request to the operating system 104 also on the host system 48. This write request may be for one record of 8K bytes. A write request as issued by the database may be referred to as a database write operation or DB write operation.

The operating system may perform a write gathering or batching operation in which one or more DB write operations may be gathered to form a single write operation request performed by the operating system when issuing a request to the data storage system. As used herein, this gathered write operation as issued by the operating system may be referred to as an OS write operation. The actual size of the OS write operation may be quite large. Additionally, in order to protect against database corruption, prior to writing any of the actual data to the storage device or database, for example, a data validity check may be performed. Only if the records or data being written are valid is the data then committed to the database and actually written to the data storage device. In connection with processing large amounts of data, the foregoing may present a problem.

One approach to ensure that data is written to the device only after successful data validity checks is to use a scratch area. The data being written to the device is checked and a copy of the existing data being overwritten may be temporarily stored on the scratch area. However, with a large amount of data, a large scratch area may not be practical when performing large gathered OS write operations. Additionally, use of a scratch area with OS writes may present a complication due to the fact that the write size is not known in advance and may be as big as several megabytes. The size of each OS write request is not guaranteed to always be a fixed size. Embodiments in which the operating system may send multiple OS write operations, for example, to multiple devices may also increase the level of complexity.

Figure 4:
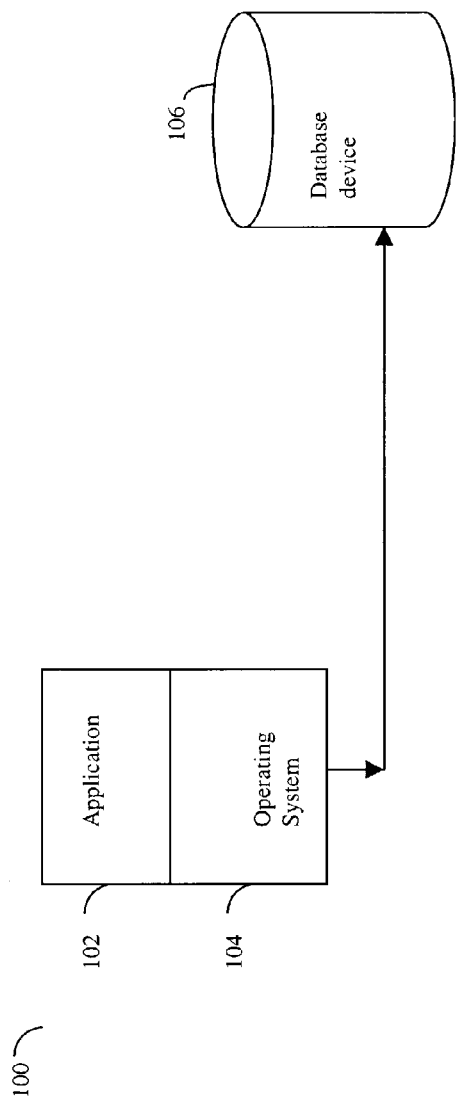
FIG. 4 is an example of an embodiment of the data flow of write operation processing.

Referring now to FIG. 4, shown is an example 100 of the data flow of write operation processing. An application 102, such as a database application, may execute on a host 48 and issue one or more database write operations. The application level designated as 102 may pass its database write requests to the operating system 104. It should be noted that 102 and 104 may represent logical layers associated with software that may be included on a host system, such as a host 48 previously described in connection with FIG. 3. It should also be noted that an embodiment may include additional intervening layers logically between the application 102 and the operating system 104. However, for the purposes of simplification and example, only these two layers are included. The application 102 may issue one or more database write operations as described elsewhere herein. The operating system in conjunction with the file system, for example, may batch or gather one or more of these database write operations for more efficient processing. The operating system 104 may send the batched database writes to the database device 106 for processing. The database device 106 may be included, for example, in a Symmetrix data storage system as described elsewhere herein.

Figure 5:
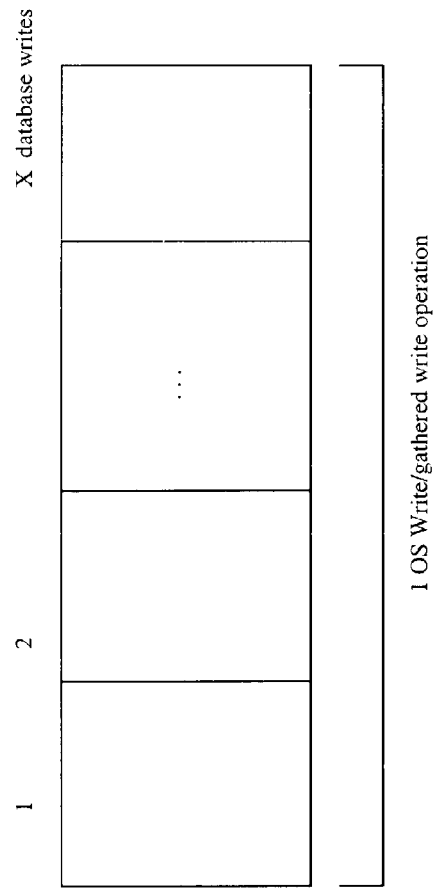
FIG. 5 is an example of a representation of a host operating system (OS) write request.

Referring now to FIG. 5, shown is a representation 60 of an OS write request. The representation 60 shows X database write operations which may be gathered and including in a single OS write operation sent from the host to a database device, for example, such as the data storage device included in data storage system 50a. If an OS write operation includes 1 through X database write operations in which each write operation is for a single database record, N of the database records may be written where N is less than X resulting in a partial write of the data associated with the OS write operation. In other words, a portion of the X database write operations or records may be written to a device or committed to a database while rejecting the remaining records without affecting the database consistency. For example, records 1 and 2 may be committed to the database while rejecting the remainder of the records associated with the OS write in the event of a data validation error, in order to maintain consistency of the database.

As described herein, particular conditions may be assumed in order to utilize the techniques described herein. A first condition has been described in connection with FIG. 5 in which a partial write of an OS write operation is permitted and may be committed to the database, for example, without affecting the database consistency. The second condition is that the database record granularity is maintained in connection with performing write operations. In other words, the database application, for example, does not request a write of a partial database record to the operating system, and, additionally the operating system, while doing the write gathering, does not partition a database record into multiple portions associated with different OS write operations. The foregoing second condition provides for maintaining the granularity of the database record such that an OS write operation is made up of multiple of DB writes. Additionally, as a third condition, the database record size is known. In one example, the database record size may be 8K bytes.

Validity criteria, such as the checksum, may be associated with each single database record. An embodiment may also include the ability to have validity criteria, such as a checksum value function, associated with multiple records. The checksum value function may calculate the checksum for one or more received records of data. It may be preferred for performance reasons to do a single data validity check for multiple database records rather than for each individual record. For example, in an Oracle™ database application described herein, the checksum is always zero for a single database record. A checksum and associated data validation check may also be performed for multiple Oracle™ database records since the checksum of the multiple database records should also be zero. However, an embodiment utilizing the Oracle™ database functionality may alternatively perform the checksum validation processing for a single database record.

By way of example, reference will be made to an embodiment that operates in accordance with the SCSI Fibre Channel standard. The SCSI standard provides for a disconnect and reconnect operation that may be used when performing a data operation using techniques described herein. The target device or data storage system, such as a Symmetrix data storage system, may disconnect from the host while the host is sending data to the target. This may be referred to as the data-out phase. The host may also disconnect from a data storage device when data is being sent from the data storage system to the host. This may be referred to as the data-in phase. It should be noted that the foregoing data in and data out are described with reference to data phases from the host's point of view.

In accordance with the SCSI Fibre Channel specification, the term disconnect may be characterized as a suspension temporarily of communications between the host and the target. The SCSI standard defines a disconnect message that may be communicated from a particular target to a sender of data, for example. When data is being sent from the host to the data storage system, the data storage system may issue a disconnect SCSI command to the host while the host is sending the data. This may cause temporary suspension of data being sent from the host to the target over a connection while the target, such as the data storage system, processes the received data. The host may utilize the particular connection and associated resources for sending/receiving data to/from other devices. Use of the disconnect message allows for efficient use of resources, such as a system bus, while data is being processed by the data storage system. When the target, such as the data storage system, wishes to resume data transfer, the data storage system may issue a reconnect message to the host and the data transfer may be resumed from where it was last stopped.

An embodiment may utilize the disconnect and reconnect command in an embodiment in accordance with the SCSI standard. Other embodiments may also utilize other techniques for efficient use of resources.

A scratch write area (SWA) may be defined and used as a scratch area in connection with performing a write operation. In connection with the techniques described herein, the SWA has a size which is an integer multiple of a database record size. It should be noted that a database record size may be, for example, 2K bytes, 4K bytes, 8K bytes, 16K bytes, or 32K bytes for data devices, or may alternately be, for example, ½ K byte, or 1K byte, in connection with other types of devices, such as log devices. As described elsewhere herein, for purposes of example with an Oracle™ database embodiment, a record size may be 8K bytes. The SWA area may be selected as a multiple of 4 database records, or 32K bytes. It should be noted that an embodiment may include an SWA having a size that is larger or smaller than as described herein and which is an integer multiple of the size of a database record.

It should be noted that the SWA as described herein may use a portion of global memory 25b described previously in connection with FIG. 2. In one embodiment, the SWA may be a selected single slot in cache. The processing steps performed to obtain storage for the SWA may be similar to processing steps executed in connection with accessing a particular cache slot for other purposes, for example, as described in U.S. Pat. No. 5,381,539, Yanai et al., entitled "System and Method for Dynamically Controlling Cache Management", assigned to EMC Corporation of Hopkinton, Mass., which is herein incorporated by reference in its entirety.

An embodiment may alternatively use other techniques in connection with implementing the SWA described herein. Alternative techniques may prove more efficient in terms of system resource utilization and bottlenecks for performance reasons. For example, one embodiment has an exclusive access cache policy for any access to the cache utilizing a hardware or software lock to enforce the exclusive access policy. Implementation of the SWA using the cache may result in unacceptable performance and further increase contention to a resource that may be already highly utilized. As an alternative technique, an embodiment may designate a portion of global memory which is not included as part of the cache to be used as the SWA in order to alleviate the lock contention for the cache. The designated portion of global memory may be, for example, a 32K byte portion which may be also be accessed exclusively through use of a hardware lock. An embodiment may vary the techniques used to control access to the particular SWA included in an embodiment.

An embodiment may use any one of a variety of different mechanisms to indicate that data validation processing should be performed for write operations associated with a particular device. In one embodiment, the device may be designated as a safe write device employing the techniques described herein for the corruption protection. In one embodiment, device information, for example, may be stored in a table or other type of data structure and included in a data configuration file that includes device specific information.

Figure 6:
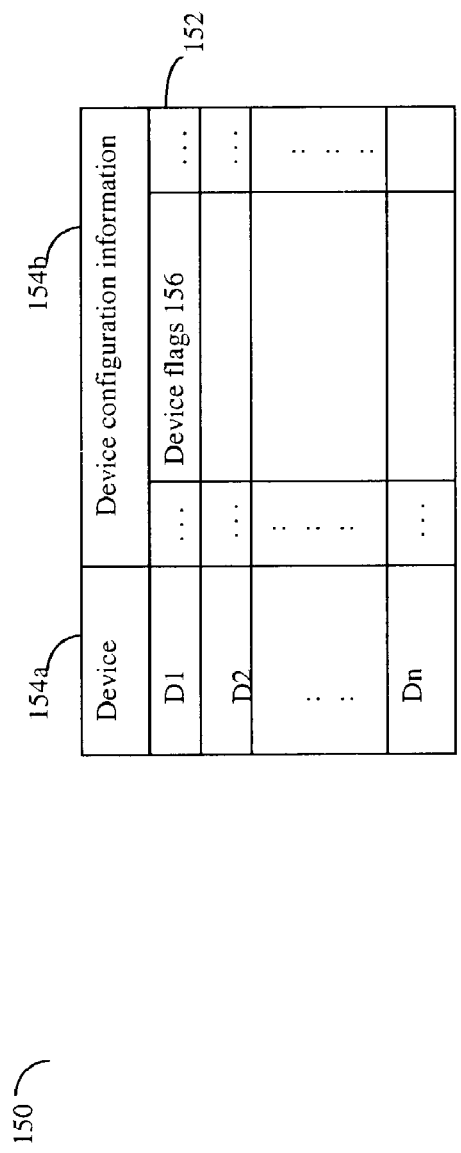
FIG. 6 is an example of an embodiment of a device configuration table.

Referring now to FIG. 6, shown is an example of a device configuration table 150 that includes device configuration information in column 154b corresponding to a device specified in the first column, 154a. A particular row of the table 150, such as 152, includes device configuration information associated with a particular device such as D1. Device flags 156 may be included as a portion of the device configuration information 154b. Device flags 156 may include one or more bit flags specifying device specific information. In one embodiment, a device in column 154a may be designated as a safe write device by setting a safe write device flag included in the device flags field 156. The safe write device flag may be set to indicate that the data storage system should perform data validation processing in connection with data operations, such as the write operation, associated with device D1. Similarly, a device flag may be included for the Oracle™ checksum device bit described elsewhere herein. Recall that the host calculates a first checksum value. A second checksum value may be calculated at the target, such as when the Oracle™ checksum device bit of an associated device is set. Additionally, processing steps described elsewhere herein may also be performed which utilize the two checksum values if the safe write device flag is set.

The device configuration information included in table 150 may be stored in a portion of global memory that includes device configuration data. The device configuration information 154b including values for device flags 156 may be specified as part of a data configuration file. The device flag may be initially set and/or subsequently modified, for example, using system calls to modify the data configuration file. An embodiment may provide for dynamic and/or manual modification of the data configuration information 154b, such as the device flag associated with the safe write device flag and Oracle™ checksum device bit or flag. Other embodiments may utilize other techniques in connection with specifying whether a checksum value is calculated at the target and whether data validation processing techniques described herein are to be performed in connection with processing a write operation to a particular target device.

It should also be noted that an embodiment may store the configuration information in global memory as well as in other locations that may vary in accordance with each embodiment. In other words, a global copy may be stored in global memory and the global copy may be stored and utilized, for example, by each of the directors or processors in an embodiment of the data storage system as described, for example, in connection with FIG. 2.

It should be noted that an embodiment may have a device record corresponding to each particular device within the system. The device record may include both dynamic and static device specific information, such as device characteristics in addition to the safe write device flag value and the Oracle™ checksum device flag. It should also be noted that a value may be specified for the safe write device and Oracle™ checksum device flags in a configuration file. The configuration file may be read at one or more times in an embodiment, for example, in connection with a device being powered-on or brought on-line, and the like. The configuration file data may be used to initialize portions of device records, for example, in connection with a device or the data storage system being brought on line.

A particular embodiment may include the configuration file in the HA or other adapter of the system. For example, an embodiment may use a SCSI adapter (SA) or fibre channel adapter (FA) rather than an HA in communications with a host. A copy of a configuration file may be stored within the HA, SA, or FA as may be included in an embodiment, for example, to minimize bus traffic within the data storage system 12. However, an embodiment may also store and read the configuration file from elsewhere, such as global memory within the data storage system 12. The particular location(s) of the configuration file may vary in accordance with each embodiment.

Figure 7:
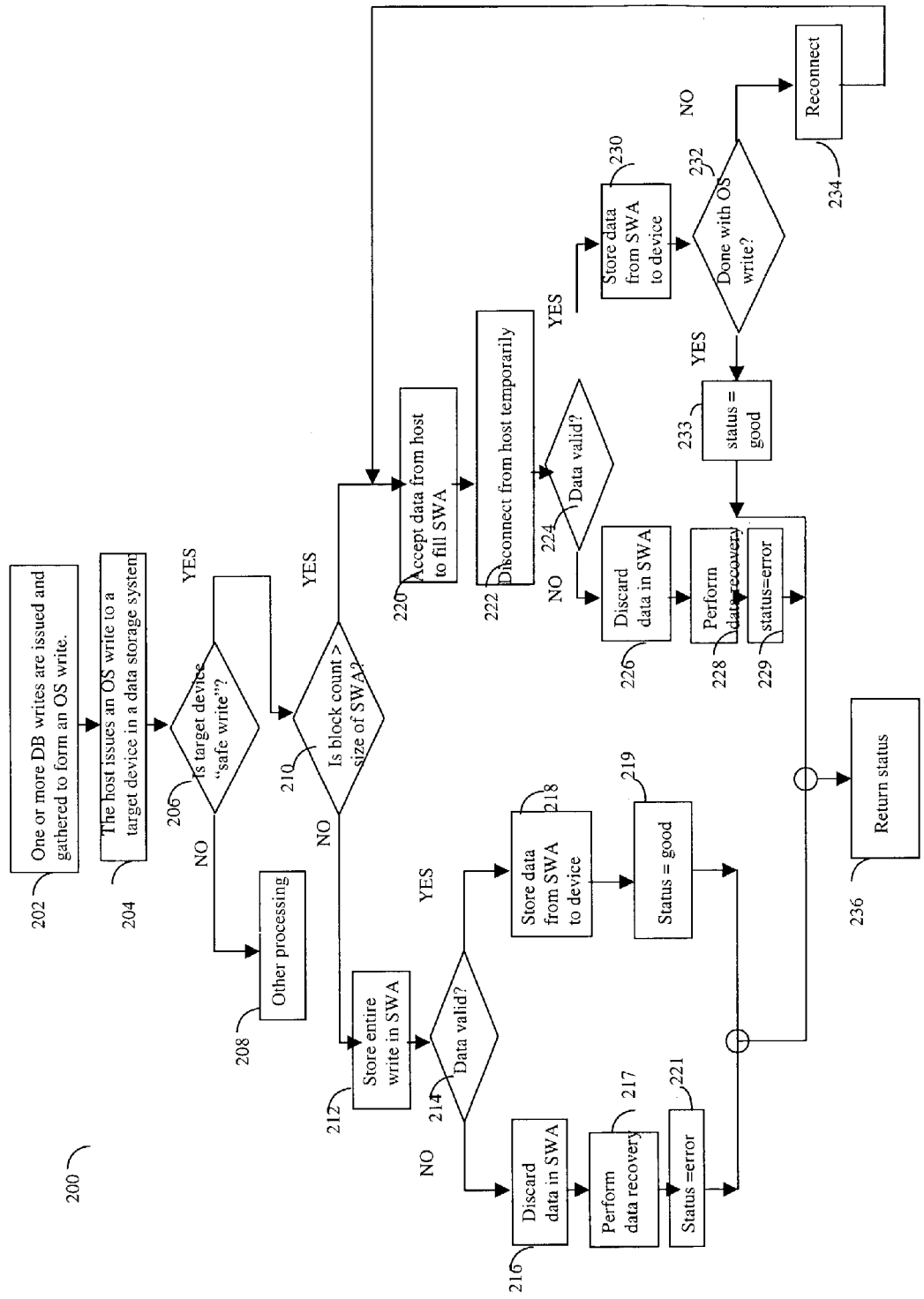
FIG. 7 is a flowchart of method steps of one embodiment for processing one or more database (DB) write operations.

Referring now to FIG. 7, shown is a flowchart 200 of steps that may be included in an embodiment for processing one or more DB write operations. At step 202, one or more DB writes are issued and gathered to form an OS write within the host. At step 204, the host issues an OS write to a target device in the data storage system. At step 206, subsequent to the data storage system receiving the OS write command or request, a determination is made as to whether the target device is indicated as a safe write device. At step 206, if the target device is not indicated as a safe write device, control proceeds to step 208 for other processing performed.

If the target device is indicated as a safe write device at step 206, indicating that data validation processing should be performed, control proceeds to step 210 where a determination is made as to whether the block count of the write request received is greater than the size of the SWA. If a determination is made at step 210 that the block count is not greater than the size of the SWA, control proceeds to step 212 where the entire write operation's data may be stored within the SWA. At step 214 a determination is made as to whether the data is valid, for example, utilizing the checksum and/or other data validation techniques. At step 214, if a determination is made that the data is valid, control proceeds to step 218 where the data from the SWA is committed to the database, or, written out to the target device and a status variable is set at step 219 to indicate a "good" in accordance with the data validity. This status is returned to the host in later processing steps. Otherwise, at step 214, if it is determined that the data is not valid, control proceed to step 216 where the data in the SWA is discarded. In other words, data corruption of some sort has occurred and been detected at step 214 and rather than corrupt the data on the device, for example, in connection with the database write, control proceeds to step 216 where the data in the SWA which includes the corrupted data is discarded. At step 217 additional data recovery processing may be performed and the status variable is set to "error" in accordance with the data validity at step 221. It should be noted that more detail in connection with performing data recovery processing is described in paragraphs and figures elsewhere herein.

If at step 210 it is determined that the block count is greater than the size of the SWA, control proceeds to step 220 where a portion of the data associated with the OS write is accepted from the host. The portion that is accepted fills the SWA. At step 222, a disconnect operation from the host may be temporarily performed. At step 224 a determination is made as to whether the data included in the SWA is valid. If so, control proceeds to step 230 where the data within the SWA is committed to the database or for example, stored to the device. At step 232, a determination is made as to whether all of the data in connection with the OS Write Operation has been processed. If all the data has been processed as determined at step 232, the status variable is set at step 233 to "good" in accordance with the data validation and control proceeds to step 236. If not, control proceeds to step 234 where a reconnect with the host is issued and control proceeds to step 220 to continually accept data from the host and perform data validity checks until all of the data with a particular OS write operation has been received. If at step 224 it is determined that a portion of the received data is not valid, control proceeds to step 226 where the received data within the SWA detected as corrupted may be discarded. Additional data recovery processing may be performed at step 228 similar to the data recovery processing of step 217 that is described in more detail elsewhere herein. The status variable is set at step 229 to "error" in accordance with the data validation.

After all of the data associated with the OS write has been processed, or processed until an error has been detected, control proceeds to step 236 where the status may be returned from the target data storage system to the host.

In an embodiment in which the data is being written to a database, for example, the foregoing processing steps of the flowchart 200 leave the database in a known, valid state through the use of partially writing the data associated with the write request. The data associated with the write request is written in portions only after each portion has been determined as including valid data. In the steps for performing additional data recovery, such as in steps 217 and 228, may vary in accordance with each embodiment. For example, one embodiment may perform processing at step 217 such as invalidating the data in the scratch area, indicating the scratch area as being available for reuse, and the like.

Instructions, such as in the form of executable code for performing the techniques described herein for data validation and corruption protection may be included in each host adapter. It should be noted that in an embodiment as described herein which operates in accordance with the SCSI Fibre Channel standard may include any one or more of particular types of HAs, such as a SCSI Adapter or director, or a Fibre Channel Adapter or director. The particular type of connection and adapters used may vary in accordance with each embodiment as described generally, for example, in connection with FIG. 1.

As described herein, to employ data validation processing of flowchart 200 of FIG. 7, an embodiment may have three different options enabled. A first option enabled is on the host system such that, for example, a checksum is determined on the host. A second option enabled on the target data storage system determines a checksum for data received for a particular target device. A third option enabled on the target data storage system causes data validation and recovery processing steps to be executed, for example, to compare checksum values and perform any data recovery processing. It is the combination of these three options being enabled in one embodiment that may be used to implement the data validation and recovery processing. Other embodiments may implement techniques described herein using different mechanisms that may vary in accordance with each embodiment.

Using the foregoing techniques, multiple database records may be received by a target data storage system in which the multiple database records are associated with a single write request from the host. Data validation may be performed on portions of the single write request. After each individual portion is validated, for example, using the checksum or other data validation technique(s), the individual portions may be written to the devices, committed to the database, and the like. Upon detecting a corrupted portion, processing may discard the remaining data of the write request. The data associated with the write request may be partially written to the target device while still maintaining data integrity and/or database consistency.

As described above, an embodiment may use a cache slot as a scratch area. What will now be described are details of one implementation and organization of such a cache, for example, as described in issued U.S. Pat. No. 5,381,539, Yanai et al., entitled "System and Method for Dynamically Controlling Cache Management", assigned to EMC Corporation of Hopkinton, Mass., which is incorporated herein by reference.

Figure 8:
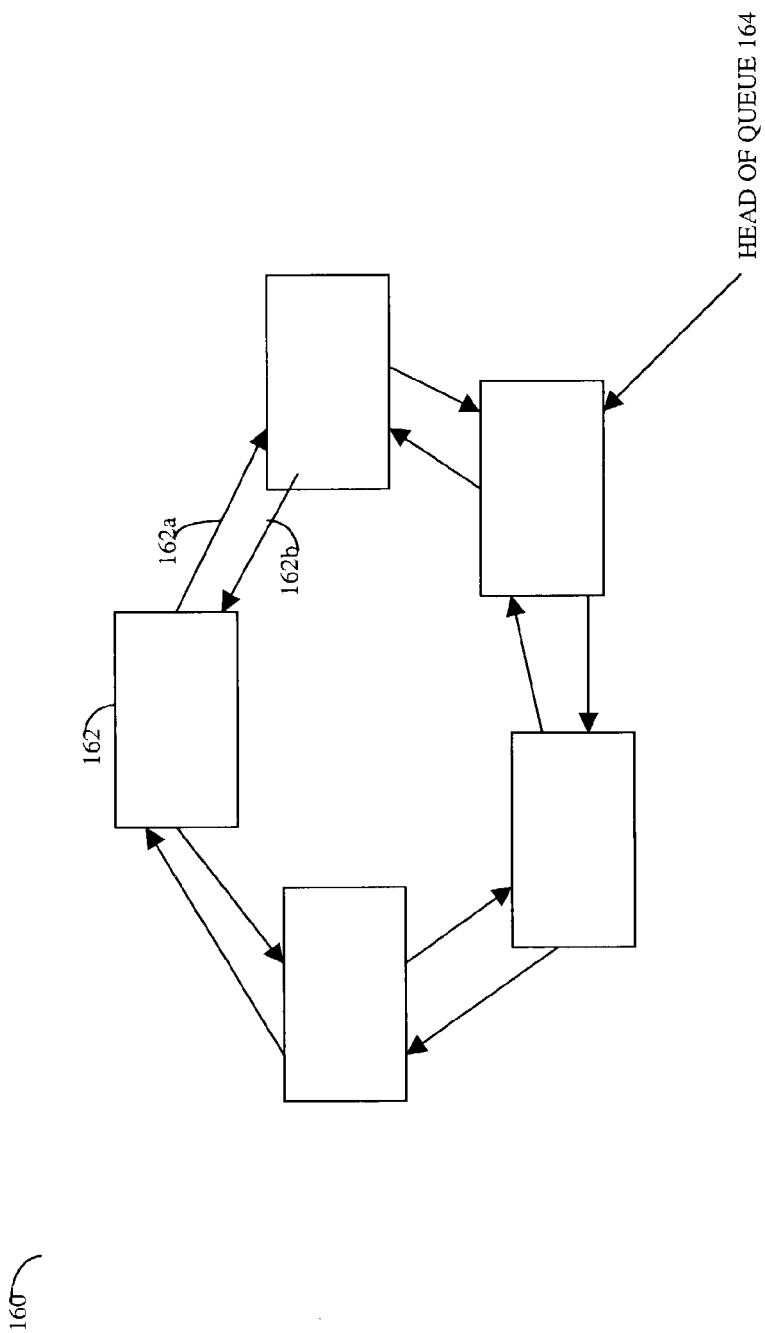
FIG. 8 is an example of an embodiment of a replacement queue that may be used as a cache.

Referring now to FIG. 8, shown is an example of an embodiment 160 of a replacement queue used as a cache, for example, when performing data operations in a system such as described previously in connection with FIGS. 1 and 2. Shown in the representation 160 is a circular structure in which each of the elements, such as 162, corresponds to a cache slot. Each cache slot may correspond to a portion of memory, such as one or more memory blocks. Each memory block may correspond to, for example, a track on one of the drives shown in connection with FIG. 2. In this representation, each of the slots are connected to other slots by forward and backward pointers, such as 162*a* and 162*b*, in a doubly linked list arrangement. Additionally, the head or beginning of the replacement queue is designated by a head pointer 164.

It should be noted that as described herein, an embodiment may include a cache which is in the form of the replacement queue using doubly linked list or other data structures known to those of ordinary skill in the art. The replacement queue described herein should not be construed as a limitation to the techniques described herein. Additionally, it should be noted that an embodiment may use a least-recently-used or other technique in determining which slots remain in the cache and which ones are removed.

Figure 9:
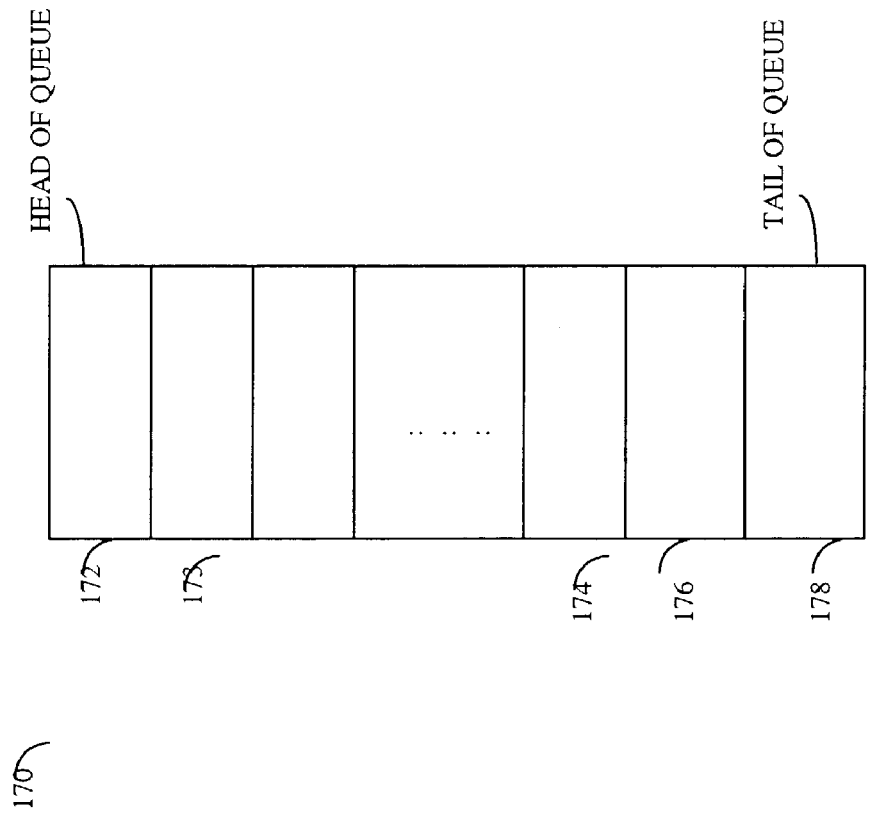
FIG. 9 is another representation of the replacement queue of FIG. 8.

Referring now to FIG. 9, shown is an equivalent representation 170 of the previously described replacement queue 160 in connection with FIG. 8. The representation shown in FIG. 9 is a logical equivalent of the representation shown in FIG. 8. The representation 170 of FIG. 9 logically corresponds to that in FIG. 8 such that, for example, element 172 corresponds to the beginning cache slot as noted by the head of the replacement queue pointer 164 in connection with the previously described figure. Similarly, the last element of the replacement queue is denoted by slot 178 which in this example is labeled also as the tail of the replacement queue. Elements or slots may be inserted into the list at the head of the replacement queue and exit or leave the cache at the tail of the replacement queue. For example, when an element is deposited into the cache, it may be placed at the head of the replacement queue in slot location denoted by 172 in connection with a read operation. Additional elements may be progressively added to the head portion or other location within the replacement queue 172. As elements are added to the queue, subsequent elements progress toward the tail of the list. When another slot is added to the replacement queue at position 172, the slot currently at position 172 moves to that slot designated as position 173 and the newly added element falls into the position of element 172.

An element may be placed in the replacement queue, for example, when an element is referenced in connection with an I/O operation such as a cache miss for a read operation, or in connection with processing pending write operations, for example. Once in the replacement queue, an element progresses through the replacement queue from the head 172 towards the tail 178 of the replacement queue.

As mentioned elsewhere herein, the foregoing queue arrangement in connection with a cache or shared memory may have drawbacks. For example, exclusive access to the queue may be implemented using a locking mechanism that only allows a single process to access the entire queue. Additionally, pointer manipulation in connection with performing management operations may also be expensive. Alternatively, as also described herein, an embodiment may utilize other techniques in connection with allocating space for a SWA.

Figure 10:
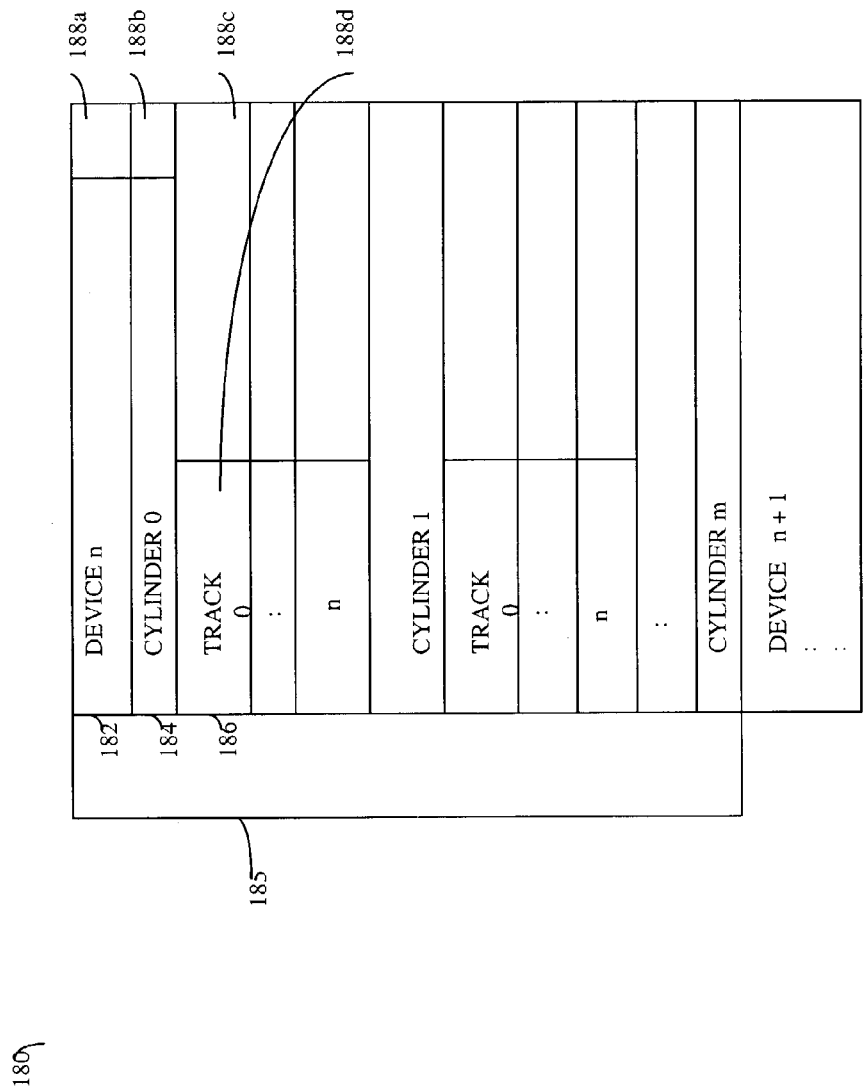
FIG. 10 is an example of an embodiment of a cache index/directory table.

To indicate the data that is stored in the cache, a cache index or directory may be used. An embodiment may implement this using any one of a variety of different arrangements and structures. FIG. 10 shows one particular representation illustrating a device-by-device cache mapping.

Referring now to FIG. 10, shown is an example of a representation of a cache index/directory table. The table 180 may be organized on a device-by-device level to indicate for a particular portion of a device, is the portion in cache, and if so, where in cache is it located. An embodiment that includes devices, for example, such as disks, may include a further refinement or granularity in the table 180 corresponding to a location in cache.

The table 180 may include a hierarchical structure relative to the structure of a disk, such as cylinders and tracks on a disk. In one embodiment, a track may be a 32Kbyte portion aligned with the beginning of the device and a cylinder may be 15 tracks. Other embodiments may use different structures and/or sizes. Each device, such as device n, may have a corresponding portion 185 included in the table. Each of the portions 185 may further be divided into sections in accordance with the disk structure. A portion 185 may include device header information 182, information for each cylinder 184 and for each track within each cylinder 186. For a device, a bit indicator 188a may indicate whether data associated with the device is stored in cache. The bit indicator 188b may further indicate for a particular cylinder within a device, is any data stored in the cache. Associated with each track may be a corresponding portion 188c indicating whether data associated with a particular track is in the cache and an associated address of where in the cache the data for a particular track may be found, for example, in connection with performing a read operation or a pending write operation. The portion 188d may include other information associated with a particular track, such as a valid cache address if data is stored in the cache for the particular track.

Figure 11:
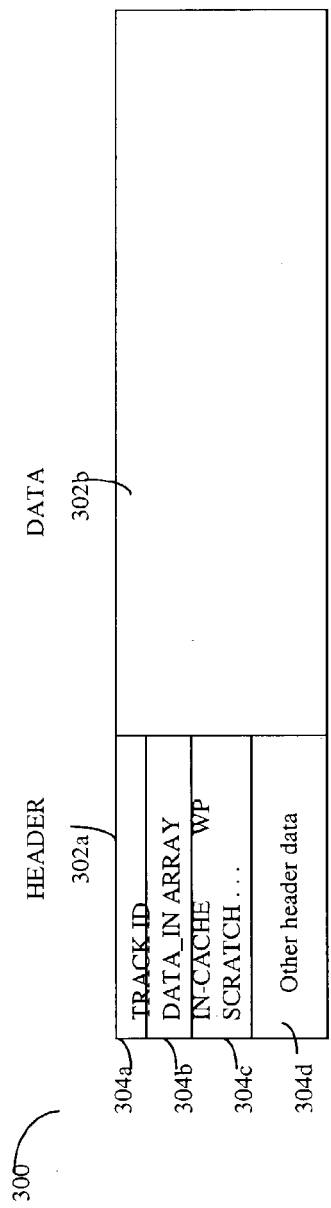
FIG. 11 is an example of an embodiment of a cache slot that may be included in the representation of FIGS. 8 and 9.

Referring now to FIG. 11, shown is an example of an embodiment of a cache slot. In this example representation 300, a cache slot may include a header portion 302a and a data portion 302b. When a cache slot is assigned to a track, the track's identifying data is stored in the slot's header. The header portion 302a may include one or more other sections including a track ID section 304a, an DATA_IN ARRAY section 304b, a FLAGS section 304c, and optionally other header data in section 304d. The TRACK_ID section 304a may include an identifier of the particular track which is associated with this cache slot. The DATA_IN ARRAY 304b may be implemented as, for example, a bit array or bit vector in which each bit position corresponds to a particular block of data of the associated track. A value of one (1) in a particular bit position in the DATA_IN array indicates that a particular block of the associated track is included in the data portion 302b at the slot 300. A zero (0) indicates otherwise.

The FLAGS section 304c may include one or more bit flags or other types of flags to indicate a certain status about the data included in 302b and the like. For example, in one embodiment, the FLAGS section 304c includes a flag called IN-CACHE which indicates whether a particular track has an associated cache slot. IN-CACHE with a value of one (1) in this embodiment indicates that this particular slot is assigned to a track as indicated in the TRACK_ID section 304a. The WP or write pending flag indicates whether data included in this particular cache slot is associated with a write pending operation. A SCRATCH flag included in the area of 304c indicates whether this cache slot is used as a scratch cache slot, for example, in connection with the SWA. It should be noted that other embodiments may include other organizations in connection with a cache slot. Additionally, an embodiment may also include other information in the particular header; for example, such as additional flags other than as described herein.

As described herein, a track is a portion of the particular device which in this example has a size of 32K bites of data and is the same amount that may be included in a single cache slot. It should be noted that other embodiments may have different size cache slots associated with different logical entities on a particular device of different sizes.

The flag in the section 304c IN-CACHE may be set when a slot is assigned to a track. When IN-CACHE is one (1), the slot may or may not hold a portion of the track's actual data in the section 302b. The fact that a particular slot is assigned or associated with a track is indicated by the value of the flag IN-CACHE being equal to one. In other words, the flag IN-CACHE having a value of one (1) does not indicate a status of whether or not there is data included in the actual data portion 302b. The section 304b DATA_IN ARRAY may be implemented as an array or a bit vector that includes a bit associated with each block of data of a particular track or slot. A value of one (1) in a particular entry in the bit array indicates that the associated block is actually stored in the data portion 302b. A zero (0) in the DATA_IN ARRAY bit position indicates otherwise. The WP flag in the section 304c is set to one (1) when a block is received from the host and is to be written to the cache slot. When a disk adapter or a DA actually writes data out to a device, the WP flag, for example in this Section 304c, may be set to zero (0) to indicate that the data is no longer write pending.

It should be noted that the foregoing notations described in connection with a cache slot are used in the following description for performing data operations in one embodiment. In connection with a read operation, the DA reads the data requested from the device and stores it in a cache slot. The DA, for example, may obtain a cache slot if there is not already one allocated and associated with a particular track ID as indicated in the track ID table 180. The data is read from the device by the DA and stored in the cache slot 302b with the appropriate bits set 304b, 304c to indicate the state of the data included therein. Additionally, the track ID table 180 may also be updated in accordance with the particular data operation.

In one embodiment, data that is to be written to a device is first stored in a cache slot and marked as a write pending. The data is then actually written out to the device at a later point in time. Use of a cache as a temporary holding place for received data to be written and other techniques may be employed in an embodiment to process the incoming write requests since the actual writing of data to a device may be characterized as comparatively slower when compared to the rate at which data is transferred to the target location.

It should be noted that a slot may be indicated as free or not associated with a track when the IN-CACHE flag in section 304c has a value of zero.

Figure 12:
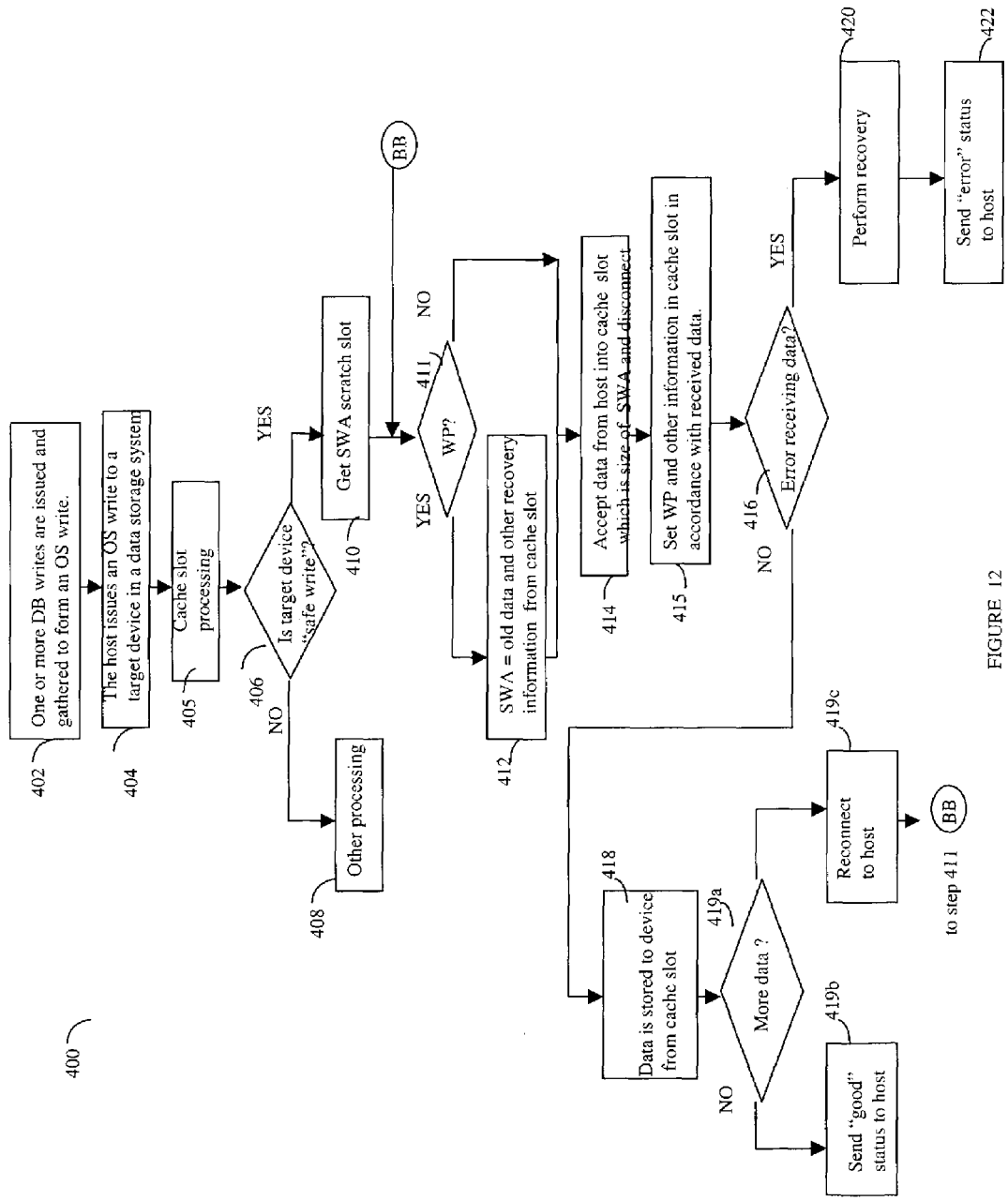
FIG. 12 and FIG. 13 are flowcharts of method steps of one embodiment for processing a write request and performing data validation and recovery processing.

Referring now to FIG. 12, shown is a flowchart of method steps of another embodiment for processing a write request and performing data validation and recovery processing. It should be noted that the some of the processing steps described in connection with the flowchart 400 are similar to those previously described in connection with flowchart 200. Flowchart 400 includes processing steps that may be used in an embodiment with a SWA that is implemented as a cache slot.

At step 402, one or more DB writes are issued and gathered to form an OS write on the host. At step 404, the host issues an OS write to the target device and the data storage system. It should be noted that steps 402 and 404 are similar to other steps described previously in connection with the flowchart 200. At step 405, cache slot processing is performed. More detail of cache slot processing will be described in more detail in the following paragraphs and figures.

At step 406, it is determined if the target device is designated as a safe write device. If not, control proceeds to step 408 where other processing is performed. It should be noted that steps 406 and 408 are similar to processing steps described previously also in connection with figure flowchart 200. If the target device is a safe write device, control proceeds to step 410. At step 410, the SWA scratch slot is obtained from the cache. As part of processing of step 410, for example, a free slot is determined and obtained from the pool of available free slots included in the data cache. As described elsewhere herein, a slot may be designated as free, for example in accordance with bit settings of the header portion of the cache slot. In the event that there are no designated free slots in the cache, different displacement algorithms may be used as known to those skilled in the art to obtain a cache slot. The particular cache management technique and other policies utilized may vary in accordance with each embodiment.

Control proceeds to step 411 where a determination is made if the current cache slot includes data, as indicated by the WP flag. If not, control proceeds to step 414. If so, control proceeds to step 412 where the SWA is initialized with the old data and other recovery information from the existing cache slot. In other words, the SWA serves as a scratch area that includes the data from the cache slot as well as existing information such as the header from the cache slot. In one embodiment, the DATA section 302b of the cache slot containing the old data is stored in the SWA DATA section 302b. Similarly, the DATA_IN ARRAY section 304b and the flags from 304c of the cache slot containing the old data may be stored in the SWA. In one embodiment, the data from sections 304b and 304c are stored in the section 304d of the SWA due to particular cache slot settings that may be determined in hardware. This may vary with each embodiment.

At step 414, data is accepted from the host into the cache slot. The amount of data is the size of the SWA. In other words, the cache slot associated with the particular track designated in connection with the write operation is overwritten with the new data received that is the size of the SWA. At step 415, the WP and other information in the cache slot, such as the DATA_IN array, is set in accordance with the newly received data. At step 416, a determination is made as to whether there was an error in receiving the data as may be determined, for example, using one or more validity checks. Step 416 processing may include, for example, comparing an expected checksum value as determined by a host with a checksum value as determined on the data storage system in accordance with the newly received data. If there was an error, control proceeds to step 420 where recovery processing may be performed. At step 422, a status is sent to the host indicating an error in transmission.

If at step 416 no error has been detected in connection with receiving the data, such as a connection with the transmission error, control proceeds to step 418 where the data is stored to the device from the cache slot. At step 419a, a determination is made as to whether there is more data to be processed. If so, control proceeds to step 419c where a reconnect to the host is performed and control proceeds to step 411. If at step 419a no more data is to be received in connection with this write operation, control proceeds to step 419b where a successful status is sent to the host.

It should be noted that as previously described in connection with flowchart 200, an embodiment such as that operating in accordance with the SCSI standard may use messages, such as disconnect and reconnect, when a data request is for a portion of data larger than one SWA size or portion. For example, after receiving a first portion of data from the host, a temporary disconnect from the host may be performed by the data storage system. After executing subsequent processing steps, the data storage system may issue a reconnect command to the host when processing resumes at step 411 to obtain additional data for the larger write requests.

Figure 13:
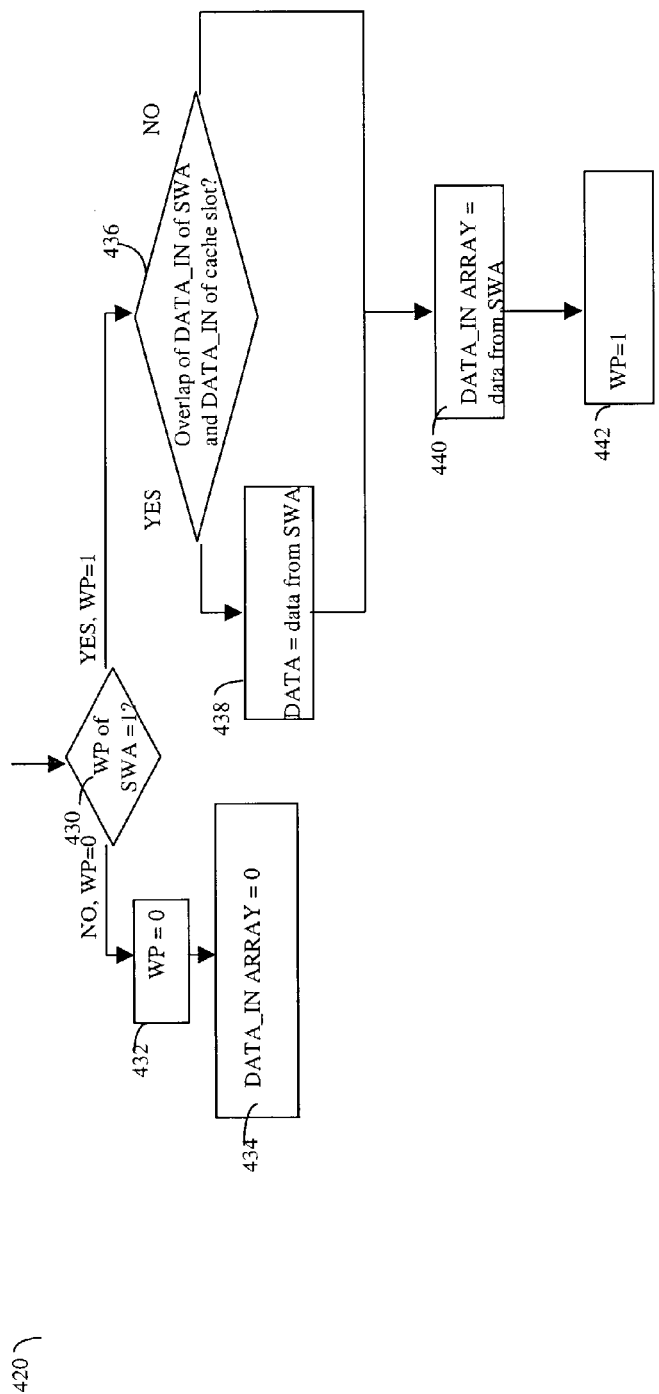

Referring now to FIG. 13, shown is a flowchart of processing steps of one embodiment for recovery processing, for example, in connection with step 420 of FIG. 12. At step 430, the write pending (WP) of the old data from the cache slot is examined to determine if the WP flag of the cache slot prior to receiving the new data at step 414 is 1. In one embodiment, this may be determined by examining the WP flag saved in section 304d of the SWA. If the previous WP flag of the cache slot is 0, control proceeds to step 432 where the WP flag of the cache slot is reset to 0 and the DATA_IN ARRAY is initialized to 0 indicating that there is no valid data in the DATA section 302b of the cache slot. It should be noted that other flags and other values of the cache slot may be set in an embodiment in order to perform a restoration of the data from the SWA to the cache slot. At step 430, if the WP flag of the old data from the cache is 1, control proceeds to step 436 where a determination is made as to whether there is an overlap of the data received with the old data of the cache slot. In other words, it is determined if the newly received data actually overwrote a section of valid data from the cache slot. This may be determined in one embodiment by examining the DATA_IN array of the SWA corresponding to the old data in the SWA cache slot and the DATA_IN array of the cache slot corresponding to the newly received and corrupted data. If there is an overlap, control proceeds to step 438 where the DATA section 302b of the current cache slot is restored by copying data from the SWA section 302b to the current cache slot section 302b. Control proceeds to step 440 where the DATA_IN array of the cache slot is restored from the SWA and the at step 442, the WP flag is set to 1 (one).

It should be noted that in the foregoing processing step 416, for example, where data validation is determined, one or more of a variety of different processing techniques may be utilized. As described herein, checksum values may be compared. Prior to reaching processing at step 416, for example, an embodiment may have calculated or otherwise obtained a checksum value for the received data on the target system. As also described herein, other embodiments may perform data validation determination using other techniques in addition to, or as an alternative to, checksum processing.

Figure 14:
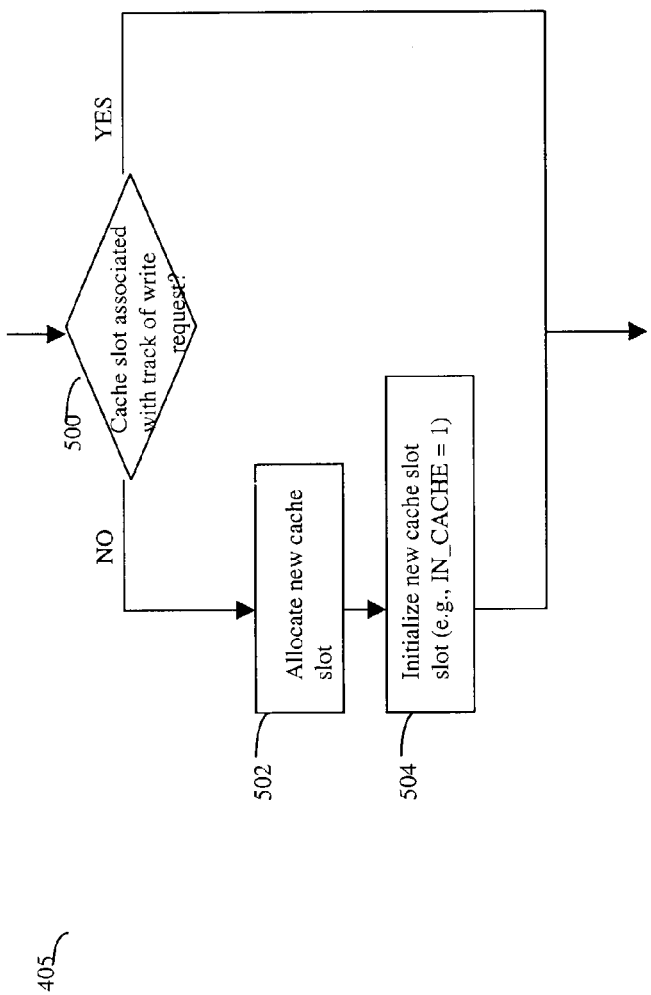
FIG. 14 is a flowchart of more detailed method steps of one embodiment for cache slot processing as described in connection with FIGS. 12 and 13.

Referring now to FIG. 14, shown is a flowchart of more detailed steps that may be performed in an embodiment in connection with cache slot processing of step 405 previously described in connection with flowchart 400 of FIG. 12. At step 500, a determination is made as to whether a cache slot is currently associated with the track of an incoming write request as received by the data storage system. Processing at step 500 may be performed, for example, by examining a corresponding track entry in Table 180 previously described in connection with FIG. 10 as well as the bits included in a cache slot header. If it is determined at step 500 that the slot is already associated with the track of an incoming write request, cache slot processing is done. Otherwise, control proceeds to step 502 where a new cache slot is allocated, for example, from the pool of cache slots that are indicated as available. Alternatively, a cache slot may be freed in accordance with any one of a variety of different policies implemented in a particular embodiment for cache policy management. Control proceeds to step 504 where the new cache slot is initialized in accordance with the current track associated with the write request. This may include, for example, initializing the IN-CACHE data bit or flag to one (1), initializing the cache slot header to include the appropriate track ID information, updating the table 180 and the like.

In connection with performing data recovery processing described in connection with the foregoing processing steps, for example at step 420, the data storage system may perform a recovery operation to restore the old data. In one embodiment utilizing a cache slot as the SWA, if the incoming data received for a write operation was to be written to a track indicated as not having a WP status prior to receiving the incoming data (such as determined at step 430), the data storage system may discard all of the newly received data, such as for example, by initializing the DATA_IN ARRAY bits and the associated cache slot to indicate that there is no data actually in the cache slot (such as at step 434). In other words, the associated cache slot may be left in a state such that the IN-CACHE bit is set and associated with a track. However, the cache slot itself is indicated as including no valid data. The next time a read or a write operation is performed, valid data will be read and stored into the appropriate cache slot. In an embodiment using this technique, when a received write operation is to a track indicated as not including write pending data, there is no actual removal or deletion of data from the cache or copying of old data. Rather, in one embodiment, the DATA_IN ARRAY is initialized to indicate that the cache slot does not contain valid data.

What will now be described is data recovery processing in connection with receiving invalid or corrupted data for a write operation to a track having a WP or write pending status prior to the new write operation data being received, such as performed in steps 436, 438, 440, and 442 of FIG. 13. In this instance, the data storage system saves the old data of the cache slot prior to accepting the new write operation data from the host. A recovery of the old previously valid data may be performed by restoring the copy of the old data from the SWA to the cache slot thereby overwriting the newly received data determined to be corrupted or invalid. Similarly, it should be noted that any status or description data such as may be included in a cache slot header may also be stored and restored in connection with the foregoing operations.

It should be noted that in an embodiment, various other tasks may also be performed independently and ongoing in addition to those described herein for processing to various operations. For example, in an embodiment having a write pending or WP status associated with a cache slot, the DA may constantly be scanning for WP cache slots associated with a device under its direction. When a particular DA locates a WP cache slot or a device controlled by the particular DA, the data may actually be written to the media or physical device. Generally, this process may be referred to as destaging where the DA destages the data from the memory or the cache slot indicated as WP to the actual device. Upon completion of the destaging operation, the DA may also accordingly set the WP indicator to be zero indicating that there is no longer a write pending operation since the data has been written out to the actual device. In one embodiment utilizing the cache, once a slot is WP, the slot may be removed from the cache or otherwise from the pool of available free slots. Once the data is written out to the actual device, the slot may be returned to the pool of available slots in the cache.

It should be noted that in one embodiment, the locks on the SWA slot and the cache data slot are held until data validation determination is complete. Subsequently, the locks on both the SWA and the cache slot are released so that the DA may then destage the data only after a determination has been made that the data associated with a WP status cache slot is valid.

It should also be noted that in connection with accessing any slot in the cache, an embodiment may implement locking techniques as described herein, for example, in accordance with the particular policy included in an embodiment. For example, in one embodiment as described herein there may be a policy of exclusive access for accessing the cache. In this instance, for example, whenever the cache is accessed to obtain a slot or write to a slot, the particular director, such as the host adapter, may lock the slot using hardware and/or software locking mechanisms as may be included in an embodiment. Similarly, when a particular director or processor has completed operations utilizing the cache, the locks are released such that the cache resource may be utilized by other processors included in the system.

It should be noted that the foregoing processing steps may be used in connection with write operations that span multiple tracks such as those starting in the middle of a track, for example, rather than on a track boundary. Referring back to one embodiment described in connection with FIG. 12, when a track of data includes a first portion of data from a first track and a second portion from a second track, the first portion is processed on a first iteration of the loop beginning at step 411. The first track's associated cache slot information is stored in a single WSA. On a subsequent iteration of the loop beginning at step 411 when a reconnect is performed, the second portion is received for a second track. The second track's associated cache slot information may be stored in the same WSA such that the second portion of data is appended to the first portion of data in the section 302b of the WSA. Other information associated with the second slot, such as the DATA_IN ARRAY and various flags, such as WP, may be stored in section 304d of the WSA. As needed, restoration of data in connection with data recovery processing is performed using the foregoing areas to which the original data was saved. Other embodiments may save data to other areas in connection with processing a write operation for a single track, for example, which spans multiple tracks.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for writing data associated with a write request to a target location comprising:
   associating, at a source location, a source data validation value with a portion of the data of the write request;
   determining if a target location of the write request is enabled for data validation processing;
   if the target location of the write request is enabled for validation processing, determining, for the portion of the data of the write request received at the target location, if the portion includes valid data using the source data validation value; and
   if the portion of data of the write request is determined as valid, storing the portion of data to the target location, and otherwise, if the portion of data of the write request is determined to be invalid, performing recovery processing using a scratch area.

2. The method of claim 1, further comprising:
   determining a target data validation value at said target location; and
   comparing said target data validation value and said source data validation value to determine if said portion is valid.

3. The method of claim 1, wherein the target location is one of: a portion of a device in a data storage system, and a device in a data storage system.

4. The method of claim 1, further comprising:
   setting a first indicator at said source location to enable associating said source data validation value with said portion of data;
   setting at least one flag associated with said target location to enable data validation processing for write operations to said target location; and
   examining said at least one flag in determining whether the target location is enabled for validation processing.

5. A method for writing data associated with a write request to a target location comprising:
   associating, at a source location, a source data validation value with a portion of the data;
   determining if a target location is enabled for data validation processing;
   if the target location is enabled for validation processing, determining, for the portion of the data received at the target location, if the portion includes valid data using the source data validation value;
   if the portion of data is determined as valid, storing the portion of data to the target location, and otherwise, if the portion of data is determined to be invalid, performing recovery processing using a scratch area;
   storing the portion of received data in the scratch area; and
   writing the portion of received data from the scratch area to the target location upon determining that the portion of data is valid.

6. A method for writing data associated with a write request to a target location comprising:
   associating, at a source location, a source data validation value with a portion of the data;
   determining if a target location is enabled for data validation processing;
   if the target location is enabled for validation processing, determining, for the portion of the data received at the target location, if the portion includes valid data using the source data validation value; and
   if the portion of data is determined as valid, storing the portion of data to the target location, and otherwise, if the portion of data is determined to be invalid, performing recovery processing using a scratch area, wherein the write request is associated with an amount of data having a size represented as "m" that is an integer multiple a value "n".

7. The method of claim 6, wherein the value "n" is a size associated with a single database write request issued by an application, and the method further comprising:
   gathering a plurality of single database write requests; and
   issuing a single gathered write request that includes said plurality of single database write requests for data to be written to said target location, said single gathered write request being of a size represented as "m".

8. The method of claim 7, wherein said scratch area size is an integer multiple of "n".

9. A method for writing data associated with a write request to a target location comprising:
   associating, at a source location, a source data validation value with a portion of the data;
   determining if a target location is enabled for data validation processing;
   if the target location is enabled for validation processing, determining, for the portion of the data received at the target location, if the portion includes valid data using the source data validation value;
   if the portion of data is determined as valid, storing the portion of data to the target location, and otherwise, if the portion of data is determined to be invalid, performing recovery processing using a scratch area;
   determining a target data validation value at said target location; and
   comparing said target data validation value and said source data validation value to determine if said portion is valid, wherein each of said source data validation value and said target data validation value includes an indicator corresponding to said portion.

10. The method of claim 9, wherein said source data validation value is a known criteria corresponding to said portion.

11. The method of claim 10, wherein said known criteria is an implied checksum value.

12. The method of claim 9, wherein said indicator includes at least one of: a checksum value, and an identifier of a routine that performs processing to determine a checksum value.

13. A method for writing data associated with a write request to a target location comprising:
   associating, at a source location, a source data validation value with a portion of the data;
   determining if a target location is enabled for data validation processing;
   if the target location is enabled for validation processing, determining, for the portion of the data received at the target location, if the portion includes valid data using the source data validation value;
   if the portion of data is determined as valid, storing the portion of data to the target location, and otherwise, if the portion of data is determined to be invalid, performing recovery processing using a scratch area, wherein a size of data associated with said write request is a multiple of another size associated with said scratch area, and the method further comprising:
   storing said portion of data to said scratch area;
   disconnecting from the source location after receiving said portion of data;
   successfully writing said portion of data to said target location; and reconnecting with the source location to receive another portion of data, wherein said data of said write request includes said portion and said another portion.

14. A method for writing data associated with a write request to a target location comprising:
   associating, at a source location, a source data validation value with a portion of the data;
   determining if a target location is enabled for data validation processing;
   if the target location is enabled for validation processing, determining, for the portion of the data received at the target location, if the portion includes valid data using the source data validation value; and
   if the portion of data is determined as valid, storing the portion of data to the target location, and otherwise, if the portion of data is determined to be invalid, performing recovery processing using a scratch area, wherein data received at said target location is stored in a cache including a plurality of cache slots, and the method further comprising:
   associating a cache slot with said target location;
   copying data from said cache slot to said scratch area if said cache slot includes valid, write pending data;
   copying said portion of data to said cache slot; and
   if the portion of data is determined not to be valid and said cache slot included write pending data, restoring data from said scratch area to said cache slot; and
   if the portion of data is determined not to be valid and said cache slot did not include write pending data, indicating that said data in said cache slot is invalid.

15. The method of claim 14, wherein said scratch area is a cache slot.

16. The method of claim 14, wherein said scratch area is selected from a portion of memory other than memory allocated for use with the cache.

17. The method of claim 14, further comprising:
   setting a first indicator at said source location to enable associating said source data validation value with said portion of data;
   setting at least one flag associated with said target location to enable data validation processing for write operations to said target location; and
   examining said at least one flag in determining whether the target location is enabled for validation processing.

18. The method of claim 17, wherein said at least one flag is included in a configuration file.

19. A method for writing data associated with a write request to a target location comprising:
   associating, at a source location, a source data validation value with a portion of the data;
   determining if a target location is enabled for data validation processing;
   if the target location is enabled for validation processing, determining, for the portion of the data received at the target location, if the portion includes valid data using the source data validation value; and
   if the portion of data is determined as valid, storing the portion of data to the target location, and otherwise, if the portion of data is determined to be invalid, performing recovery processing using a scratch area, wherein a cache slot is used as a temporary holding area for data to be written to the target location, and the method further comprising:
   storing existing data in a cache slot to the scratch area;
   storing the portion of received data to the cache slot; and
   writing the portion of received data from the cache slot to the target location upon determining that the portion of data is valid.

20. A computer readable medium comprising machine executable code stored thereon that writes data associated with a write request to a target location, the computer readable medium comprising:
   machine executable code that associates, at a source location, a source data validation value with a portion of the data of the write request;
   machine executable code that determines if a target location of the write request is enabled for data validation processing;
   machine executable code that determines for the portion of the data of the write request received at the target location, if the portion includes valid data using the source data validation value when the target location of the write request is enabled for validation processing; and
   machine executable code that stores the portion of data of the write request to the target location if the portion of data is determined as valid, and otherwise, performs recovery processing using a scratch area if the portion of data of the write request is determined to be invalid.

21. The computer readable medium of claim 20, further comprising:
   machine executable code that determines a target data validation value at said target location; and
   machine executable code that compares said target data validation value and said source data validation value to determine if said portion is valid.

22. The computer readable medium of claim 20, wherein the target location is one of: a portion of a device in a data storage system, and a device in a data storage system.

23. The computer readable medium of claim 20, further comprising:
   machine executable code that sets a first indicator at said source location to enable associating said source data validation value with said portion of data;
   machine executable code that sets at least one flag associated with said target location to enable data validation processing for write operations to said target location; and
   machine executable code that examines said at least one flag in determining whether the target location is enabled for validation processing.

24. A computer readable medium comprising machine executable code stored thereon that writes data associated with a write request to a target location, the computer readable medium comprising:
   machine executable code that associates, at a source location, a source data validation value with a portion of the data;
   machine executable code that determines if a target location is enabled for data validation processing;
   machine executable code that determines for the portion of the data received at the target location, if the portion includes valid data using the source data validation value, when the target location is enabled for validation processing;
   machine executable code that stores the portion of data to the target location if the portion of data is determined as valid, and otherwise, performs recovery processing using a scratch area if the portion of data is determined to be invalid;
   machine executable code that stores the portion of received data in the scratch area; and machine executable code that writes the portion of received data from the scratch area to the target location upon determining that the portion of data is valid.

25. A computer readable medium comprising machine executable code stored thereon that writes data associated with a write request to a target location, the computer readable medium comprising:
   machine executable code that associates, at a source location, a source data validation value with a portion of the data;
   machine executable code that determines if a target location is enabled for data validation processing;
   machine executable code that determines for the portion of the data received at the target location, if the portion includes valid data using the source data validation value, when the target location is enabled for validation processing; and
   machine executable code that stores the portion of data to the target location if the portion of data is determined as valid, and otherwise, performs recovery processing using a scratch area if the portion of data is determined to be invalid, wherein the write request is associated with an amount of data having a size represented as "m" that is an integer multiple a value "n".

26. The computer readable medium of claim 25, wherein the value "n" is a size associated with a single database write request issued by an application, and the computer readable medium further comprising:
   machine executable code that gathers a plurality of single database write requests; and
   machine executable code that issues a single gathered write request that includes said plurality of single database write requests for data to be written to said target location, said single gathered write request being of a size represented as "m".

27. The computer readable medium of claim 26, wherein said scratch area size is an integer multiple of "n".

28. A computer readable medium comprising machine executable code stored thereon that writes data associated with a write request to a target location, the computer readable medium comprising:
   machine executable code that associates, at a source location, a source data validation value with a portion of the data;
   machine executable code that determines if a target location is enabled for data validation processing;
   machine executable code that determines for the portion of the data received at the target location, if the portion includes valid data using the source data validation value, when the target location is enabled for validation processing;
   machine executable code that stores the portion of data to the target location if the portion of data is determined as valid, and otherwise, performs recovery processing using a scratch area if the portion of data is determined to be invalid;
   machine executable code that determines a target data validation value at said target location; and
   machine executable code that compares said target data validation value and said source data validation value to determine if said portion is valid, wherein each of said source data validation value and said target data validation value includes an indicator corresponding to said portion.

29. The computer readable medium of claim 28, wherein said source data validation value is a known criteria corresponding to said portion.

30. The computer readable medium of claim 29, wherein said known criteria is an implied checksum value.

31. The computer readable medium of claim 28, wherein said indicator includes at least one of: a checksum value, and an identifier of a routine that performs processing to determine a checksum value.

32. A computer readable medium comprising machine executable code stored thereon that writes data associated with a write request to a target location, the computer readable medium comprising:
   machine executable code that associates, at a source location, a source data validation value with a portion of the data;
   machine executable code that determines if a target location is enabled for data validation processing;
   machine executable code that determines for the portion of the data received at the target location, if the portion includes valid data using the source data validation value, when the target location is enabled for validation processing; and
   machine executable code that stores the portion of data to the target location if the portion of data is determined as valid, and otherwise, performs recovery processing using a scratch area if the portion of data is determined to be invalid, wherein a size of data associated with said write request is a multiple of another size associated with said scratch area, and the computer readable medium further comprising:
   machine executable code that stores said portion of data to said scratch area;
   machine executable code that disconnects from the source location after receiving said portion of data;
   machine executable code that successfully writes said portion of data to said target location; and
   machine executable code that reconnects with the source location to receive another portion of data, wherein said data of said write request includes said portion and said another portion.

33. A computer readable medium comprising machine executable code stored thereon that writes data associated with a write request to a target location, the computer readable medium comprising:
   machine executable code that associates, at a source location, a source data validation value with a portion of the data;
   machine executable code that determines if a target location is enabled for data validation processing;
   machine executable code that determines for the portion of the data received at the target location, if the portion includes valid data using the source data validation value, when the target location is enabled for validation processing; and
   machine executable code that stores the portion of data to the target location if the portion of data is determined as valid, and otherwise, performs recovery processing using a scratch area if the portion of data is determined to be invalid, wherein data received at said target location is stored in a cache including a plurality of cache slots, and the computer readable medium further comprising:
   machine executable code that associates a cache slot with said target location;
   machine executable code that copies data from said cache slot to said scratch area if said cache slot includes valid, write pending data;
   machine executable code that copies said portion of data to said cache slot; and machine executable code that, if the portion of data is determined not to be valid and said cache slot included write pending data, restores data from said scratch area to said cache slot; and machine executable code that, if the portion of data is determined not to be valid and said cache slot did not include write pending data, indicates that said data in said cache slot is invalid.

34. The computer readable medium of claim 33, wherein said scratch area is a cache slot.

35. The computer readable medium of claim 33, wherein said scratch area is selected from a portion of memory other than memory allocated for use with the cache.

36. The computer readable medium of claim 33, further comprising:

machine executable code that sets a first indicator at said source location to enable associating said source data validation value with said portion of data;

machine executable code that sets at least one flag associated with said target location to enable data validation processing for write operations to said target location; and machine executable code that examines said at least one flag in determining whether the target location is enabled for validation processing.

37. The computer readable medium of claim 36, wherein said at least one flag is included in a configuration file.

38. A computer readable medium comprising machine executable code stored thereon that writes data associated with a write request to a target location, the computer readable medium comprising:

machine executable code that associates, at a source location, a source data validation value with a portion of the data;

machine executable code that determines if a target location is enabled for data validation processing;

machine executable code that determines for the portion of the data received at the target location, if the portion includes valid data using the source data validation value, when the target location is enabled for validation processing; and machine executable code that stores the portion of data to the target location if the portion of data is determined as valid, and otherwise, performs recovery processing using a scratch area if the portion of data is determined to be invalid, wherein a cache slot is used as a temporary holding area for data to be written to the target location, and the computer readable medium further comprising:

machine executable code that stores existing data in a cache slot to the scratch area;

machine executable code that stores the portion of received data to the cache slot; and machine executable code that writes the portion of received data from the cache slot to the target location upon determining that the portion of data is valid.

* * * * *